Feb. 27, 1962     G. A. LYON     3,022,868
AIR CIRCULATING WHEEL STRUCTURE
Original Filed Jan. 14, 1954
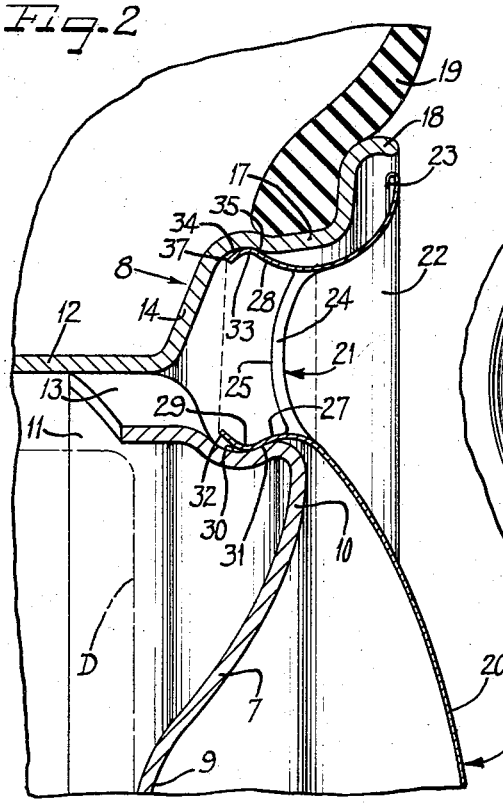
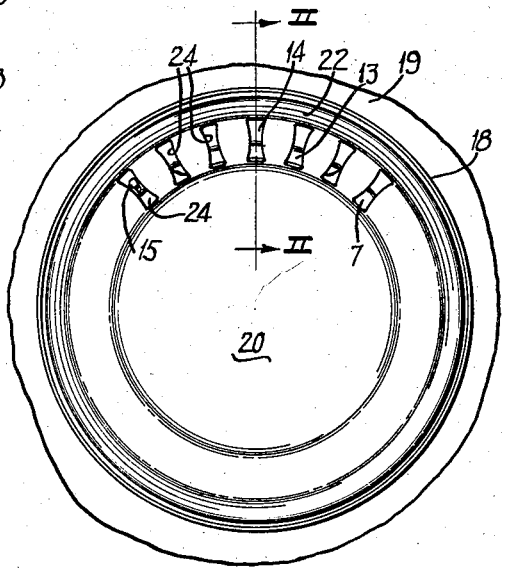
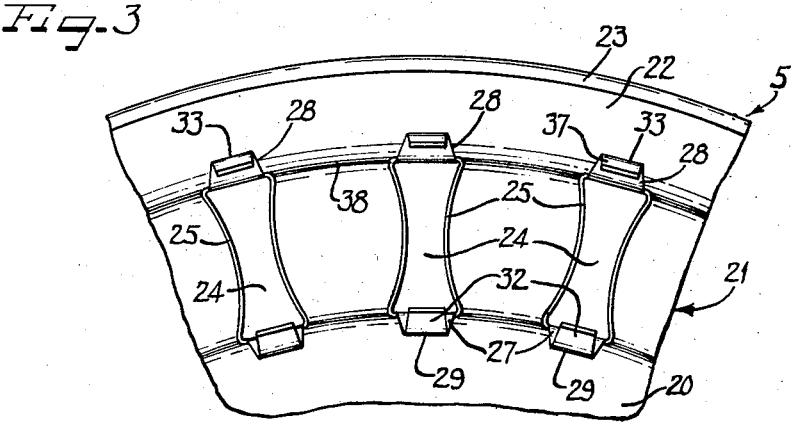
Inventor
George Albert Lyon
by Hill, Sherman, Meroni, Gross & Simpson Attys United States Patent Office 3,022,868
Patented Feb. 27, 1962

3,022,868
AIR CIRCULATING WHEEL STRUCTURE
George Albert Lyon, Detroit, Mich., assignor to Lyon Incorporated, Detroit, Mich., a corporation of Delaware
Original application Jan. 14, 1954, Ser. No. 404,021, now Patent No. 2,885,038, dated May 5, 1959. Divided and this application July 30, 1958, Ser. No. 751,974
9 Claims. (Cl. 188—264)

The present invention relates to improvements in wheel structures and more particularly concerns the ornamental and protective covering of the outer sides of wheels and providing for circulation of air therethrough as for brake drum cooling.

The present application is a division of my application Serial No. 404,021 filed January 14, 1954, now Patent No. 2,885,038, issued May 5, 1959.

An important object of the present invention is to provide an improved wheel structure having brake drum cooling air circulation openings therethrough and with a cover for the outer side of the wheel retained thereon in a manner which is in keeping with the desirability for effective air circulation through the wheel.

A further object of the invention is to provide an improved wheel cover for disposition at the outer side of a vehicle wheel and having novel retaining spring finger means enabling snap-on, pry-off application and removal of the cover.

Still another object of the invention is to provide in a vehicle wheel cover novel means for self-attachment of the cover to a vehicle wheel.

Yet another object is to provide in a wheel structure a cover arrangement which will substantially entirely cover the outer side of the wheel but is provided with openings through which dirt and gravel entering behind the cover through the wheel openings may escape.

It is also an object of the present invention to provide an improved vehicle wheel having novel means for retaining engagement thereof by a plurality of sets of cover retaining fingers on a wheel cover.

Other objects, features and advantages of the present invention will be readily apparent from the following detailed description of a preferred embodiment thereof, taken in conjunction with the accompanying drawing, in which:

FIGURE 1 is a fragmentary side elevational view of a wheel structure embodying features of the invention;

FIGURE 2 is an enlarged fragmentary radial sectional view taken substantially on the line II—II of FIGURE 1; and FIGURE 3 is a fragmentary rear elevational view of a portion of the cover of FIGURES 1 and 2.

A cover 5 is constructed and arranged to be applied in press-on, pry-off relation over the outer side of a vehicle wheel such as an automobile wheel including a disk spider wheel body 7 carrying a drop center, multi-flange tire rim 8. The wheel body 7 has the usual central bolt-on flange 9 by which it is secured in assembly with the vehicle to an axle flange carrying a brake drum D. Intermediately the wheel body has an annular generally axially outwardly projecting nose bulge 10 while peripherally a generally axially extending attachment flange 11 of the wheel body is suitably attached as by riveting or welding to the radially inner side of a base flange 12 of the tire rim. At suitable intervals such as four, the base flange 11 is inset to provide respective openings 13 through the wheel at juncture with the tire rim and especially suitable for circulation of air through the wheel in cooling relation to the brake drum D.

At its axially outer side the base flange 12 of the tire rim merges with a side flange 14 facing generally axially outwardly and from which projects a valve stem 15. Extending generally axially outwardly from the radially outer side of the side flange 14 of the tire rim is an intermediate flange 17 merging with a terminal flange 18. Carried by the tire rim is a pneumatic tire 19 which may be of the tubeless type or may be a tire and tube assembly, as preferred.

According to the present invention, the cover 5 is constructed and arranged to substantially cover the entire outer side of the wheel including the wheel body 7 and the tire rim 8 but is equipped to afford effective circulation of air through the wheel and the cover. At the same time, the cover 5 is equipped for effective press-on, pry-off engagement with the wheel. To this end, the cover 5 includes a central portion or crown of a diameter to overlie the central portion of the wheel body and preferably the nose bulge 10, merging with an annular generally dished inwardly convex and outwardly concave intermediate portion 21 joining at its radially outer side a generally radially and axially outwardly extending radially outer annular marginal portion 22 of a diameter to overlie the tire rim and more particularly the terminal flange 18, the extremity of the portion 22 being underturned to provide a reinforcing and finishing bead-like edge flange 23 which in assembly with the wheel is adapted to lie adjacent to the tip of the terminal flange lip.

The intermediate dished portion 21 of the cover is dimensioned to extend a limited distance into the substantial annular axially outwardly opening groove between the nose bulge 10 and the intermediate flange 17 and to overlie the portions of the wheel body and the tire rim adjacent to juncture thereof and more particularly the wheel openings 13. For promoting circulation of air through the wheel and the cover, the dished portion 21 of the cover is provided with a series of transversely extending generally radially elongated openings or slots 24 disposed in a series uniformly spaced in the intermediate portion 21. In the present instance, the openings 24 are shown as of narrow width and substantial number so that with respect to each of the wheel openings 13, a plurality of the cover openings 24 will in each instance provide direct air passage for circulation through the wheel opening and the plurality of openings overlying the same in the cover. Each of the openings 24 is defined by a reinforcing and finishing flange 25 entirely thereabout and derived from the material struck from the opening and extending generally axially inwardly. These flanges 25 at the radially inner and outer ends of the openings 24 extend substantially as uniform continuations of respectively the crown portion 20 and the radially outer cover portion 22 and since such end portions of the flanges 24 are integral in one piece with the side portions of the flanges afford substantial reinforcing stiffness for the perforated intermediate annular portion 21 of the cover compensating for any tendency toward weakening of such portion by the perforating thereof.

The slots or openings 24 are each wider at its radially opposite ends as compared with a medial or central portion of the slot so that when the fingers are struck from the slots they are each wider at the end of the finger joined with the cover as compared to the opposite free end 32 of the finger.

Material struck from the opening 24 is utilized to provide resilient spring retaining fingers 27 and 28 at respectively the radially inner and radially outer ends of the openings 24. By preference, the fingers 27 and 28 project generally axially inwardly as integral one-piece extensions from the respective radially inner and radially outer aperture end portions of the respective flanges 24 and thus also extend as extensions from the radially inner and radially outer circular portions of the cover.

For retaining interengagement with the wheel, the retaining fingers 27 are respectively provided with generally radially inwardly humped or directed retaining shoulder portions 29 engageable retainingly in a generally radially outwardly opening angular groove 30 provided in the radially outer face of the nose bulge 10 of the wheel body, the radially outer portion of the nose bulge being for this purpose provided with a generally axially extending flange portion closely adjacent to the indented portions of the wheel body attachment flange affording the wheel openings 13. At its axially outer side, the groove 30 is defined by a shoulder 31 facing generally radially outwardly and axially inwardly and behind which the indented turned finger shoulder 30 in each instance is adapted to engage. It will be appreciated, of course, that normally the finger shoulder portions 29 extend radially inwardly to a diameter which is in differential relation to the diameter of the engaged surface within the groove 30, being on a smaller diameter than the groove surface so that after the cover has been assembled with the wheel, the retaining fingers 27 are flexed resiliently radially outwardly so as to react with gripping resilient tension into the groove and more particularly behind the shoulder 31 for retaining the cover on the wheel. To facilitate press-on of the fingers 27 with respect to the wheel, the terminal portions of the fingers 27 are provided with generally radially outwardly and axially inwardly extending cam terminals 32 which during press-on of the cover are adapted to cam over the generally radially and axially outwardly projecting nose portion of the nose bulge 10.

Each of the retaining fingers 28 is preferably constructed as substantially a continuation of arcuate transverse curvature of the annular cover portion 22. Adjacent to its axially inner terminus, each of the fingers 28 is provided with a generally radially outwardly indented engagement shoulder portion 33 normally extending to a differential diameter at variance with the diameter within a generally radially inwardly opening groove 34 provided at juncture of the intermediate flange 17 with the side flange 14 of the tire rim. At its axially outer side, the groove 34 is defined by a generally radially and axially inwardly facing annular shoulder 35 behind which the finger shoulders 33 are engageable in press-on, pry-off relation. The extremities of the fingers 28 are preferably turned generally radially and axially inwardly to provide cam tips 37 for smooth camming engagement with the intermediate flange 17 incident to press-on of the cover.

In applying the cover 5 to the outer side of the wheel, the valve stem 15 is registered through one of the cover openings 24 and the cover is pressed axially inwardly to snap the retaining fingers 27 and 28 behind the respective shoulders 31 and 35 of the wheel. By virtue of the two concentric series rows of retaining fingers 27 and 28 engaging with opposed, confronting grooved shoulder portions of the wheel, extremely effective retention of the cover on the wheel is effected.

Where the width of either of the series of fingers 27 or 28 is substantially greater so that the individual fingers are stiffer, either of the series of fingers may be omitted, utilizing only one series of fingers. However, in the form shown the retaining fingers are respectively rather narrow and thus individually of only limited resilient retaining capability. Therefore, for maximum cover retention the two series of fingers are desirable.

It will be observed that in the assembled relation of the cover with the wheel, the outer marginal portion 22 of the cover is held in spaced relation to the tire rim so that not only may air circulate through the openings 24 but also through the gap between the cover portion 22 and the tire rim. In addition, dirt or gravel can escape from behind the cover through the wheel openings 24 and also through the gap between the tire rim and the cover portion 22.

Also, it will be appreciated that the retaining fingers 27 and 28 afford effective cushioning for the cover against transverse pressures and shocks such as road shocks.

Removal of the cover 5 from the wheel may be readily effected by application of a pry-off tool such as a screwdriver behind the outer marginal turned reinforcing edge 23 and applying pry-off leverage to the margin of the cover. As the pry-off leverage progresses, the tip of the pry-off tool may engage behind a pry-off shoulder 38 annularly in line with the radially outer ends of the openings 34 and provided at juncture of the convexly outwardly curved marginal portion 22 of the cover with the concavely dished portion 21 of the cover.

It will be understood that modifications and variations may be effected without departing from the scope of the novel concepts of the present invention.

I claim as my invention:

1. In a wheel structure including a wheel body and a tire rim, said body and rim having confronting spaced generally axially extending portions each of which includes a cover member retaining shoulder structure, a cover for disposition over the outer side of the wheel including an annular portion for disposition over the wheel between said confronting rim and body portions, said cover portion having extending generally axially inwardly therefrom cover retaining means thrusting retainingly against both of said shoulder structures.

2. In a wheel structure including wheel body and rim parts, said parts having in predetermined spaced relation confronting spaced generally axially extending portions, and a cover member for disposition over the outer side of the wheel including generally axially inwardly extending generally radially resiliently flexible cover retaining means including members facing oppositely and normally spaced apart slightly more than said confronting portions, said members being resiliently deflectable toward one another between said confronting portions and engageable under resilient thrust with both of said confronting portions.

3. In a wheel structure including wheel body and rim parts, both of said parts having confronting spaced generally axially extending portions, and a cover member for disposition over the outer side of the wheel including generally axially inwardly extending cover retaining means engageable under resilient thrust with both of said confronting portions, said confronting portions having confronting grooves and said retaining means being constructed to snap into said grooves.

4. In a wheel structure including a wheel body and a tire rim supported thereby, the wheel body and the tire rim having confronting annular generally axially extending flange portions with confronting annular grooves therein defined by respective shoulders at the axially outer sides thereof, a cover member for disposition at the outer side of the wheel including an annular portion having a series of openings therethrough confronting the area of the wheel between said flange portions, and material struck from said openings providing respective generally axially inwardly extending cover retaining fingers including a series of fingers having generally radially inwardly projecting turned portions for snappingly engaging within the groove of the body flange portion and a series of generally axially extending fingers having generally radially outwardly directed turned portions for snappingly engaging within the groove of the rim flange.

5. In a wheel structure including a wheel body and a tire rim supported thereby, the wheel body and the tire rim having confronting annular generally axially extending flange portions with confronting annular grooves therein defined by respective shoulders at the axially outer sides thereof, a cover member for disposition at the outer side of the wheel including an annular portion having a series of openings therethrough confronting the area of the wheel between said flange portions, and material struck from said openings providing respective generally axially inwardly extending cover retaining fingers including a series of fingers having generally radially inwardly projecting turned portions for snappingly engaging within the groove of the body flange portion and a series of generally axially extending fingers having generally radially outwardly directed turned portions for snappingly engaging within the groove of the rim flange, said fingers supporting the radially outer portion of the cover member in spaced relation to the tire rim to provide a gap between said outer portion and the tire rim.

6. In a cover for disposition at the outer side of a vehicle wheel, a circular cover member having an intermediate dished portion provided with a plurality of transversely extending openings therein, material struck from said openings being directed generally axially inwardly at the respectively opposite radial ends of the openings and providing cover retaining fingers projecting generally axially inwardly behind the cover member and engageable with generally confronting radially inner and radially outer portions of a wheel.

7. In a cover for disposition at the outer side of a vehicle wheel, a circular cover member having an intermediate dished portion provided with a plurality of transversely extending openings therein, material struck from said openings being directed generally axially inwardly at the respectively opposite radial ends of the openings and providing cover retaining fingers projecting generally axially inwardly behind the cover member and engageable with generally confronting radially inner and radially outer portions of a wheel, said fingers in each instance comprising substantially axially inward continuations of the cover portions at the respective opposite ends of the openings.

8. In a cover for disposition at the outer side of a vehicle wheel, a circular cover member having an intermediate dished portion provided with a plurality of transversely extending openings therein, material struck from said openings being directed generally axially inwardly at the respectively opposite radial ends of the openings and providing cover retaining fingers projecting generally axially inwardly behind the cover member and engageable with generally confronting radially inner and radially outer portions of a wheel, said fingers in each instance comprising substantially axially inward continuations of the cover portions at the respective opposite ends of the openings, said openings being defined by continuous reinforcing flanges the radially inner and outer portions whereof comprise continuations of the radially inner and outer cover portions and said fingers comprising extensions from said radially inner and outer portions of the reinforcing flanges.

9. A circular cover member for a vehicle wheel, the cover having an intermediate dished portion provided with a plurality of radially extending slots, each of the slots being wider at its radially opposite ends as compared with a medial portion of the slot, material struck from said slots being directed generally axially inwardly at opposite radially inner and outer ends of each of the slots providing radially spaced sets of generally axially inwardly extending cover retaining fingers, each of said fingers in said sets being wider at its end joined with the cover at the area of the slot as compared to its opposite free wheel engaging end.

References Cited in the file of this patent
UNITED STATES PATENTS

| | | |
|---|---|---|
| 1,320,551 | Holley | Nov. 4, 1919 |
| 2,231,931 | Lyon | Feb. 18, 1941 |
| 2,368,228 | Lyon | Jan. 30, 1945 |
| 2,368,238 | Lyon | Jan. 30, 1945 |
| 2,445,330 | Lyon | July 20, 1948 |
| 2,624,631 | Lyon | Jan. 6, 1953 |
| 2,631,066 | Horn | Mar. 10, 1953 |
| 2,757,973 | Lyon | Aug. 7, 1956 |
| 2,885,038 | Lyon | May 5, 1959 |